United States Patent
Adams et al.

(10) Patent No.: US 10,347,193 B2
(45) Date of Patent: Jul. 9, 2019

(54) ELECTRONIC DEVICE INCLUDING DISPLAY AND METHOD OF APPLYING PRIVACY FILTER

(71) Applicant: BlackBerry Limited, Waterloo (CA)

(72) Inventors: Neil Patrick Adams, Waterloo (CA); Jeremy Lawson Kominar, Waterloo (CA)

(73) Assignee: BlackBerry Limited, Waterloo (CA)

(*) Notice: Subject to any disclaimer, the term of this patent is extended or adjusted under 35 U.S.C. 154(b) by 0 days.

(21) Appl. No.: 15/631,354

(22) Filed: Jun. 23, 2017

(65) Prior Publication Data
US 2018/0374431 A1    Dec. 27, 2018

(51) Int. Cl.
G09G 3/30     (2006.01)
G09G 3/34     (2006.01)
G06F 21/84    (2013.01)
G06F 3/14     (2006.01)
G06F 21/60    (2013.01)

(52) U.S. Cl.
CPC ............ *G09G 3/3406* (2013.01); *G06F 3/14* (2013.01); *G06F 21/60* (2013.01); *G06F 21/84* (2013.01)

(58) Field of Classification Search
None
See application file for complete search history.

(56) References Cited

U.S. PATENT DOCUMENTS

| 8,922,480 | B1 | 12/2014 | Freed et al. |
| 2010/0275266 | A1* | 10/2010 | Jakobson ............... G06F 3/14 726/26 |
| 2015/0185989 | A1 | 7/2015 | Prud'Hommeaux et al. |
| 2016/0179231 | A1 | 6/2016 | Kwak et al. |
| 2017/0116930 | A1* | 4/2017 | Johnson ............. G09G 3/3406 |
| 2017/0263208 | A1* | 9/2017 | Imai .................. G09G 5/10 |
| 2017/0329399 | A1* | 11/2017 | Azam ................ G06F 3/013 |

FOREIGN PATENT DOCUMENTS

EP    2945098 A1    11/2015

OTHER PUBLICATIONS

3M Privacy Filter for 14.1 inches Standard Laptop—(PF141C3B), Amazon.com: Customer Reviews retrieved on May 24, 2017, 6 pages. Retrieved from URL: https://www.amazon.com/product-reviews/B00006B8A9.
European Patent Application No. 18179049.4, Extended European Search Report dated Aug. 13, 2018.

* cited by examiner

*Primary Examiner* — Adam R. Giesy
(74) *Attorney, Agent, or Firm* — Borden Ladner Gervais LLP; Geoffrey deKleine

(57) ABSTRACT

A method of applying a privacy filter to display information on a display of an electronic device, includes receiving information for display on the display of the electronic device, detecting a light condition of the display, and applying a privacy filter setting based on the light condition of the display.

20 Claims, 3 Drawing Sheets

ELECTRONIC DEVICE INCLUDING DISPLAY AND METHOD OF APPLYING PRIVACY FILTER

FIELD OF TECHNOLOGY

The present disclosure relates to applying a privacy filter to information on a display of an electronic device.

BACKGROUND

Electronic devices, have gained widespread use and may provide a variety of functions including, for example, telephonic, electronic messaging and other personal information manager (PIM) application functions. Electronic devices include several types of devices including mobile stations such as simple cellular telephones, smart telephones, wireless PDAs, and computers.

Such electronic devices are often able to display various types of information to a user. In some situations, protection of the information displayed to inhibit viewing by others near the electronic device that is displaying the information is desirable. Software display privacy filters, which operate to reduce the visibility of the information displayed on a device display, may operate to protect the displayed content from viewing by others near the device.

Improvements in protection of such information are desirable.

BRIEF DESCRIPTION OF THE DRAWINGS

Embodiments of the present disclosure will now be described, by way of example only, with reference to the attached figures, in which.

DETAILED DESCRIPTION

Figure 1:
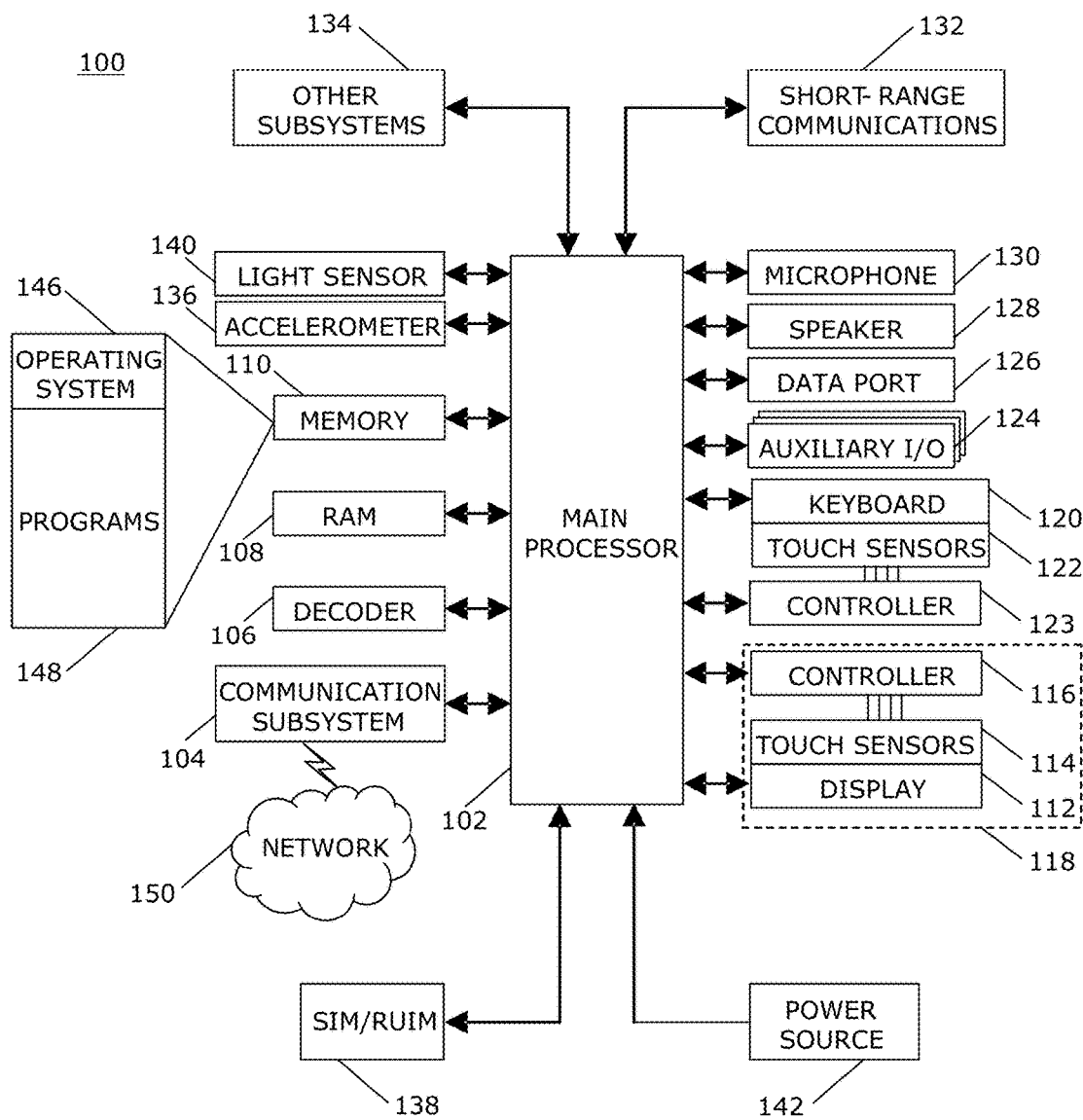
FIG. 1 is a block diagram of a portable electronic device in accordance with the present disclosure.

The following describes an electronic device including a display and a method of applying a privacy filter to display information on the display of the electronic device. The method includes receiving information for display on the display of the electronic device, detecting a light condition of the display, and applying a privacy filter setting based on the light condition of the display.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device. Examples of electronic devices include mobile, or handheld, wireless communication devices such as cellular phones, cellular smart-phones, wireless organizers, personal digital assistants, computers, tablet computers, mobile internet devices, electronic navigation devices, and so forth.

A block diagram of one example of an electronic device 100, which in the present example is a portable electronic device, is shown in FIG. 1. The electronic device 100 includes multiple components, such as a processor 102 that controls the overall operation of the electronic device 100. Communication functions, including data and voice communications, are performed through a communication subsystem 104. Data received by the electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the electronic device 100.

The processor 102 interacts with other components, such as a Random Access Memory (RAM) 108, memory 110, a touch-sensitive display 118, a keyboard 120, an auxiliary input/output (I/O) subsystem 124, a data port 126, a speaker 128, a microphone 130, short-range communications 132 and other device subsystems 134. The speaker 128, also referred to as an earpiece speaker, is utilized to output audible signals when a user's ear is very close to the speaker 128. Although not shown, the processor may also interact with a loudspeaker, for example, for hands-free use.

The processor 102 also interacts with a light sensor 140 for detecting ambient light level and, based on the ambient light level, adjusting the brightness or contrast or both, of the touch-sensitive display 118.

The touch-sensitive display 118 includes a display 112 and touch sensors 114 that are coupled to at least one controller 116 that is utilized to interact with the processor 102. Input via a graphical user interface is provided via the touch-sensitive display 118. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

The keyboard 120 includes a plurality of keys, which may be mechanical keys that include mechanical switches or contacts for input to the electronic device 100 when a mechanical key of the keyboard is depressed by a sufficient amount to oppose a bias of the mechanical key. In addition, the keys of the keyboard include touch sensors 122 coupled to a controller 123 to detect touch input thereon. The controller may be a keyboard controller 123 as illustrated in FIG. 1. Alternatively, the keys of the keyboard 120 may be coupled to the controller 116 utilized to detect touches using the touch sensors 114 of the touch-sensitive display 118.

To identify a subscriber for network access, the electronic device 100 may utilize a Subscriber Identity Module or a Removable User Identity Module (SIM/RUIM) card 138 for communication with a network, such as the wireless network 150. Alternatively, user identification information may be programmed into memory 110.

The electronic device 100 includes an operating system 146 and software programs, applications, or components 148 that are executed by the processor 102 and are typically stored in a persistent, updatable store such as the memory 110. Additional applications or programs may be loaded onto the electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive touch-sensitive display that includes a plurality of capacitive touch sensors 114. Capacitive touch sensors 114 include drive electrodes, also known as transmission electrodes, and sense electrodes, also known as receive electrodes. The drive electrodes generally extend in one direction and cross over or under the sense electrodes, which generally extend in another direction, generally at right angles to the direction that the drive electrodes extend, to form a grid pattern. The drive electrodes are spaced from the sense electrodes by a dielectric material. The points at which the drive electrodes and the sense electrodes cross each other are referred to as nodes. The drive and sense electrodes may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected.

By repeatedly scanning the electrodes of the touch-sensitive display 118 to detect touches, movement of a touch relative to the touch-sensitive display 118 may be detected. One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

The touch sensors 122 on the keyboard may be any suitable touch sensors, such as capacitive touch-sensors and may comprise any suitable material, such as indium tin oxide (ITO). Optionally, the touch sensors 122 disposed on the keyboard 120 may be coupled to the same controller 116 as the touch sensors of touch-sensitive display 118 such that a single controller is utilized rather than two controllers 116, 123.

One or more touches on the keys of the keyboard 120 may be detected. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the keyboard 120. A touch may be detected from any suitable input member and multiple simultaneous touches may be detected.

One or more gestures may also be detected utilizing the touch sensors 122 disposed on the keyboard 120. A gesture on the keys of the keyboard 120 may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover.

The touch-sensitive display 118 includes a display area in which information may be displayed, and a non-display area extending around the periphery of the display area. Information is not displayed in the non-display area by the display. The non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image can be displayed by the display 112 in the non-display area. Optionally, a secondary display, not part of the primary display 112, may be disposed in the non-display area. Touch sensors including drive electrodes and sense electrodes may be disposed in the non-display area, which touch sensors may be extended from the touch sensors in the display area or may be distinct or separate touch sensors from the touch sensors in the display area. A touch, including a gesture, may be associated with, i.e., performed on, the display area, the non-display area, or both areas. The touch sensors including the drive electrodes and the sense electrodes may extend across substantially the entire non-display area or may be disposed in only part of the non-display area.

Figure 2:
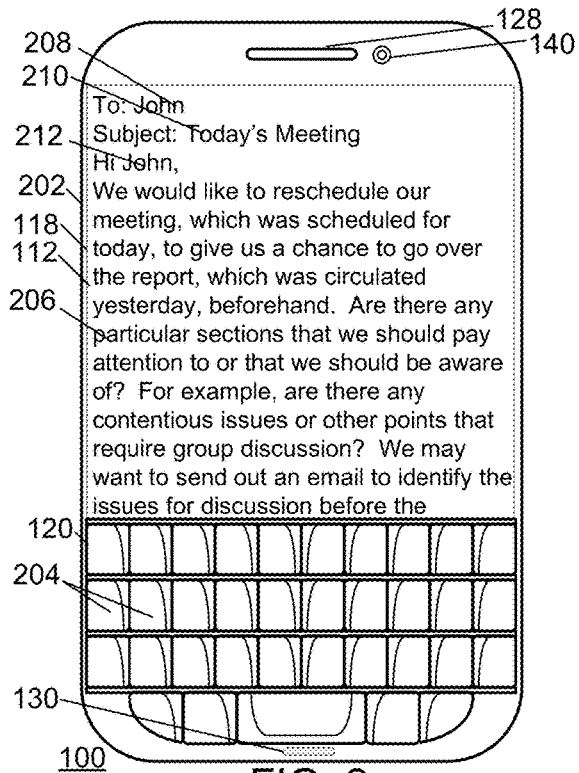
FIG. 2 is a front view of an example of an electronic device in accordance with the present disclosure.
Figure 3:
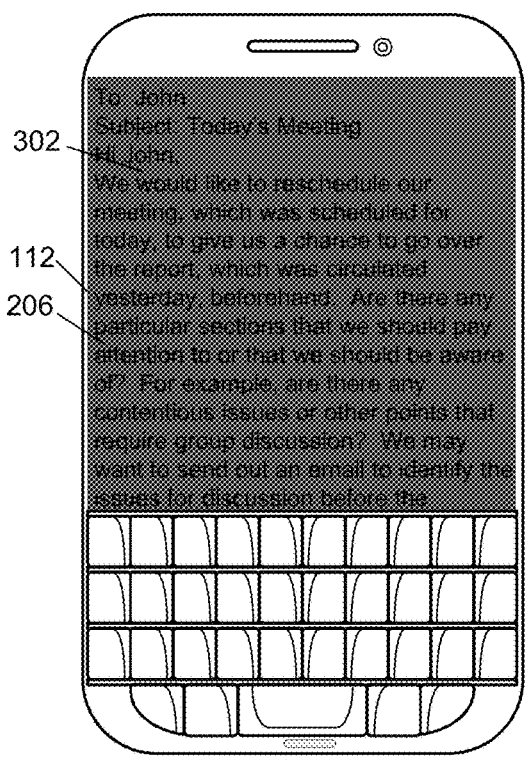
FIG. 3 through FIG. 5 illustrate examples of privacy filters in accordance with the disclosure.
Figure 4:
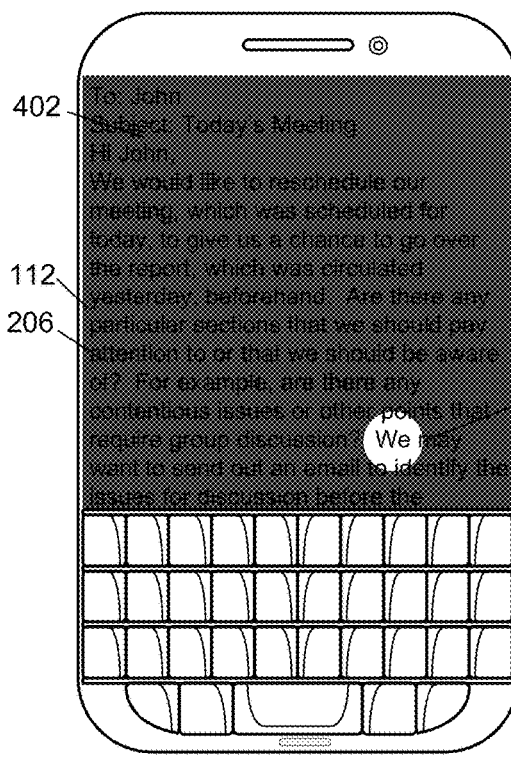
Figure 5:
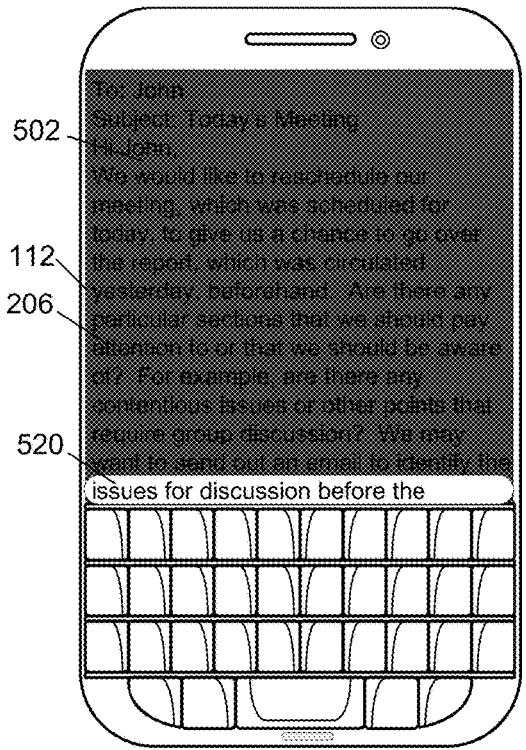

An example of an electronic device without a privacy filter applied is shown in FIG. 2. Examples of an electronic device 100 including privacy filters are shown in FIG. 3 through FIG. 5. In these examples, the electronic device 100 includes a housing 202 in which the touch-sensitive display 118 is disposed. The housing 202 is utilized to enclose components such as the components shown in FIG. 1. The keyboard 120 is disposed below the touch-sensitive display 118 in the orientation illustrated in FIG. 2 through FIG. 5.

The mechanical keyboard 120 includes a plurality of keys 204. Each one of the keys 204 of the keyboard is associated with a character such that a character is entered utilizing a key 204. The keyboard 120 in the present example, includes four rows of keys 204 other numbers of rows of keys may be implemented, however.

The light sensor 140 is disposed in an opening in the housing 202 for detecting ambient light level. Based on the ambient light level detected utilizing the light sensor 140, the brightness or contrast or both, of the display 112 of the touch-sensitive display 118, the brightness of the keyboard 120, and any other suitable component, may be adjusted. The brightness of the display 112 may be automatically adjusted based on the ambient light level such that the information displayed is discernable in different light levels, without unnecessarily displaying at a very high brightness in all conditions. Unnecessary display of information at very high brightness reduces the time between battery charging, or the life of the display 112, or both.

The speaker 128 and the microphone are also disposed in openings in the housing 202. As indicated above, the speaker 128 outputs audible information and the microphone 130 is utilized to convert audible information into electrical signals for processing.

For the purpose of the example of FIG. 2, information received 206 is displayed on the touch-sensitive display 118. The information displayed may include any suitable information such as icons, text, pictures, video, documents, a webpage, or any other suitable information. The information may be associated with, for example, a home page, a menu or submenu, an application or applications, and so forth.

The information received 206 in the example of FIG. 2 through FIG. 5 is a message, such as an email message displayed on the touch-sensitive display 118. The information received 206 that is displayed is text that includes words or strings in sentences arranged in paragraphs. Part of the information may not be displayed. For example, the information may too long, or may be displayed at a font or character size that is too large to be displayed at one time on the touch-sensitive display 118. Additional information may be displayable, for example, by scrolling upwardly or downwardly to change the part of the information that is displayed.

The email message may be a message received or a message composed utilizing the portable electronic device 100. The information includes fields such as a recipient or "To:" field 208, a "Subject" field 210 and a message content field 212.

FIG. 2 illustrates a state of the electronic device 100 in which no privacy filter is provided. The information is information received 206, for example, from another electronic device via a network connection, received from the memory 110, or received from entry of the text utilizing the keyboard 120. The information is displayed on the display 112 of the touch-sensitive display 118 without obscuring any portion of the text received. Thus, the content of the received text is exposed for viewing. For the purpose of the present example, the information is text of an email. The information may be any other suitable information associated with any other suitable application from any suitable source.

FIG. 3 illustrates a state in which the information received 206, which is text in this example, is completely obscured by presenting an image for which the background 302 is darkened, thus reducing the contrast between the text that is displayed and the background. By darkening the image, displayed text is obscured to reduce readability and thereby reduce the chance of reading by others that are near the electronic device 100. The apparent transparency of the background is thus reduced. As a result, information displayed on the display 112 may still be discernible by the user when viewing the information from a position close to the device and within a suitable viewing angle. The information may not be discernible, however, to a person viewing from a position outside of a specified range and outside of a suitable viewing angle.

FIG. 4 illustrates a state in which information received 206, which is text in this example, is partially exposed such that a portion 420 of the information received 206 is unobscured and the remaining text is obscured by darkening the background 402 around the remaining text to reduce the contrast between the remaining text and the background 402. In this example, the remaining text that is obscured may be so obscured to make the text unreadable. For the purpose of this example, the portion 420 of the text that is unobscured is circular in shape such that the text in the circular region is displayed clearly. Other shapes of unobscured regions may be implemented, however. For example, the unobscured region may be elliptical, square, or irregular in shape.

FIG. 5 illustrates another state in which information received 206, which is text in this example, is partially exposed such that a portion 520 of the information received 206 is unobscured and the remaining text is obscured by darkening the background 502 around the remaining text to reduce the contrast between the remaining text and the background 502. In this example, the remaining text that is obscured may be so obscured to make the text unreadable. For the purpose of this example, the portion 520 of the text that is unobscured is an entire line of text displayed such that the final line of text is displayed clearly. The display of the final line of text is useful for facilitating reading of the information received 206 or, for example, composition of the information in the form of text that is received at the processor 102.

In each of the examples shown in FIG. 3 through FIG. 5, the information that is not exposed is obscured by darkening the background to reduce the contrast between the background and the text. Alternatively, the information may be obscured by reducing the darkness of the information, or by generally blurring the information to reduce readability or discernability of the information.

Figure 6:
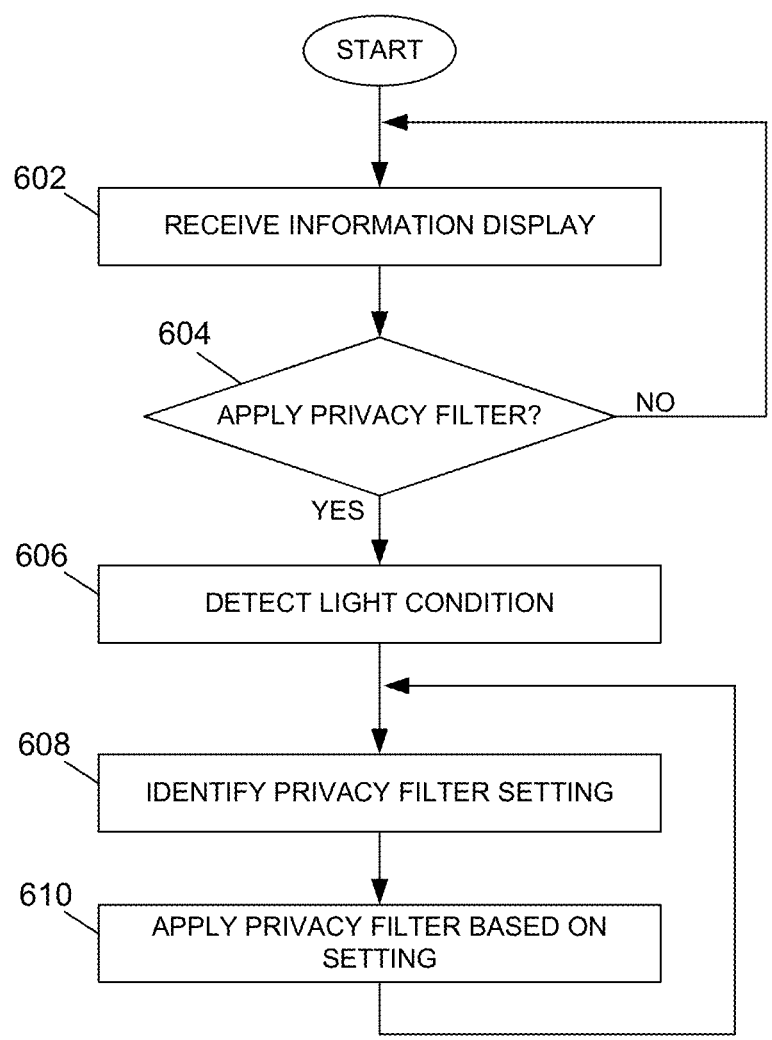
FIG. 6 is a flowchart illustrating a method of applying a privacy filter in accordance with the present disclosure.

A flowchart illustrating a method of applying a privacy filter to information on a display of an electronic device, such as the portable electronic device 100, is shown in FIG. 6. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor, such as the processor 102, of the portable electronic device to perform the method may be stored in a computer-readable storage medium, such as a non-transitory computer-readable medium.

Information is received for displaying on the display 112 at 602. The information may include text, characters, symbols, images, icons, and other items that may be displayed or rendered on a portable electronic device 100 in association with an application executed by the processor 102, such as, for example, an electronic mail, calendar, address book, word processor, Web browser, or any other suitable application. The information may be information received from another electronic device in communication with the electronic device 100, may be information stored on the electronic device 100 and thus received at the processor 102 from memory such as the memory 110, information received at the processor 102 from an input device such as the keyboard 120, for example, during composition of a message, note, or any other information.

A determination is made whether to apply a privacy filter at 604. The privacy filter may be applied based on a setting or settings in the associated application, based on a setting or settings on the electronic device 100, based on the information received, a source, sender, or author of the information received, a subject, a keyword or keywords in the information received, a flag or other indicator associated with the information received, or any other suitable basis. In one example, a classification may be associated with the information received at 602. The classification may include, for example, unclassified, private, or top secret. Other classifications may also be utilized. The classifications may be utilized to determine whether or not a privacy filter is applied and, optionally, may be utilized to determine which privacy filter is applied, such as which of the examples of privacy filters disclosed with reference to FIG. 3 to FIG. 5 is utilized.

Alternatively or in addition, the determination whether to apply a privacy filter may be based on indications such as detection of another person within a specified proximity of the electronic device 100, within a viewing angle of the electronic device 100, or other criteria.

Optionally, the determination to apply a privacy filter may be made in response to receipt of a command, which is input by a user, for example, to apply the privacy filter. In a specific example, a particular swipe gesture may be associated with a command to apply the privacy filter. For example, a multi touch vertical swipe downwardly on the display 112 or on the keyboard 120 may be associated with a command to apply the privacy filter and thus, results in continuation of the method at 606.

A light condition is detected at 606. The light condition may be a brightness of the display 112. The brightness of the display 112 may be, for example, set by a user setting utilizing a menu or submenu on the electronic device 100. The brightness of the display 112 may also be automatically adjusted based on an ambient light level sensed utilizing the light sensor 140. Alternatively, the light condition detected at 606 may be an ambient light level detected utilizing the light sensor 140. The light sensor 606 is disposed in a front of the portable electronic device 100 to sense the ambient light level in front or near the display 112 of the portable electronic device 100 to display or adjust display of the information based on the ambient light level.

A privacy filter setting is identified at 608 based on the light condition detected at 606. The privacy filter setting may be a single setting or more than one setting. For example, the privacy filter setting may be a display background darkness, a contrast level of the information, a level of blur effect, a darkness of the information displayed, or a combination thereof. For example, the privacy filter may be a background darkness to adjust an apparent transparency of the background to maintain a generally constant level of privacy despite the changing brightness level of the display 112. Thus, the privacy filter setting is dependent on the light condition, which may be a brightness level of the display 112 or an ambient light level which may be utilized to adjust a brightness level of the display 112. The privacy filter setting may be identified in any suitable manner. For example, the privacy filter setting may be determined by calculation utilizing a number or measure of the light condition detected. Alternatively, each of a plurality of privacy filter settings may be associated with a respective light condition detected utilizing a lookup table or graph. Any other suitable method of associating privacy filter setting with the light condition detected may be implemented.

The privacy filter setting may be associated with a baseline setting configurable or operable to be set in any suitable manner by a user. The changing of a setting such as the apparent transparency facilitates maintaining a constant level of privacy such that the same level of privacy is provided when the display brightness changes as the level of privacy provided when the baseline setting was set.

The privacy filter setting is applied at 610 and the information is displayed with the privacy filter utilizing the setting or settings. Thus, the display background darkness, contrast level of the information, a level of blur effect or extent of blurring of the information, a darkness of the information displayed, or a combination thereof are adjusted based on the light condition detected at 606 to maintain a constant level of privacy in changing light conditions.

The process continues at 606 to adjust the privacy filter as the light condition changes.

As the ambient light conditions change and the brightness level of the display 112 is adjusted, the setting the privacy filter is also adjusted to continue to provide privacy and reduce the chance that others read the information displayed on the display 112. For example, with increasing ambient light, and thus increasing display brightness, the apparent transparency of the privacy filter is decreased. With decreasing ambient light, and thus decreasing display brightness, the apparent transparency of the privacy filter is increased. In this example, the apparent transparency of the privacy filter is adjusted to provide a generally constant level of privacy despite the changing ambient light conditions and brightness of the display 112. In another example, the extent of blurring of the information is adjusted to provide a generally constant level of privacy despite the changing ambient light conditions and brightness of the display 112.

Utilizing the method described herein, the privacy filter is adjusted as the brightness of the display changes to improve the effectiveness of the privacy filter, for example, when the display brightness level is very high. The privacy filter may be adjusted directly in response to a change in brightness of the display or may be adjusted in response a change in the ambient light level, which results in a change in brightness of the display. Thus, as light levels change, the privacy filter is adjusted to maintain effectiveness of the privacy filter.

The scope of the claims should not be limited by the preferred embodiments set forth in the examples, but should be given the broadest interpretation consistent with the description as a whole.

What is claimed is:

1. A method of applying a privacy filter to information on a display of an electronic device, the method comprising:
   receiving information for display on the display of the electronic device;
   detecting a light condition of the display;
   identifying a privacy filter setting based on the light condition of the display;
   displaying the information such that the information is visible and a background darkness is set based on the privacy filter setting, providing an apparent transparency of a privacy filter; and
   adjusting the privacy filter setting based on the light condition of the display by identifying a second privacy filter setting in response to a change in the light condition and displaying the information such that the information is visible and the background darkness is changed based on the second privacy filter setting, changing the apparent transparency of the privacy filter;
   wherein the apparent transparency of the privacy filter is decreased with increasing ambient light.

2. The method according to claim 1, wherein detecting a light condition comprises sensing ambient light.

3. The method according to claim 1, wherein detecting a light condition comprises detecting a brightness of the display.

4. The method according to claim 1, wherein the privacy filter setting comprises a transparency of the privacy filter.

5. The method according to claim 4, wherein the transparency of the privacy filter decreases with increasing brightness of the display.

6. The method according to claim 1, wherein the information comprises text.

7. The method according to claim 1, wherein the information comprises images.

8. The method according to claim 1, wherein receiving the information comprises receiving, from a user input device, the information for display.

9. The method according to claim 1, wherein receiving the information comprises receiving transmitted information via a network connection.

10. A non-transitory computer-readable medium having computer-readable code stored thereon, the computer-readable code executable by at least one processor of an electronic device to:
- receive information for display on a display of the electronic device;
- detect a light condition of the display;
- identify a privacy filter setting based on the light condition of the display;
- display the information such that the information is visible and a background darkness is set based on the privacy filter setting, providing an apparent transparency of a privacy filter; and
- adjust the privacy filter setting based on the light condition of the display by identifying a second privacy filter setting in response to a change in the light condition and displaying the information such that the information is visible and the background darkness is changed based on the second privacy filter setting, changing the apparent transparency of the privacy filter;
- wherein the apparent transparency of the privacy filter is decreased with increasing ambient light.

11. The non-transitory computer-readable medium according to claim 10, wherein the computer-readable code is executable by at least one processor of an electronic device to detect the light condition by sensing ambient light.

12. The non-transitory computer-readable medium according to claim 10, wherein the computer-readable code is executable by at least one processor of an electronic device to detect the light condition by detecting a brightness of the display.

13. An electronic device comprising:
- a display for displaying information;
- a processor operably coupled to the display to control the display to:
  - receive information for displaying;
  - determine a light condition of the display;
  - identify a privacy filter setting based on the light condition of the display;
  - display the information such that the information is visible and a background darkness is set based on the privacy filter setting, providing an apparent transparency of a privacy filter;
  - adjust the privacy filter setting based on the light condition of the display by identifying a second privacy filter setting in response to a change in the light condition and displaying the information such that the information is visible and the background darkness is changed based on the second privacy filter setting, changing the apparent transparency of the privacy filter;
  - wherein the apparent transparency of the privacy filter is decreased with increasing ambient light.

14. The electronic device according to claim 13, comprising a sensor coupled to the processor for detecting an ambient light condition, and wherein the light condition comprises the ambient light condition.

15. The electronic device according to claim 13, wherein the light condition comprises a brightness of the display.

16. The electronic device according to claim 13, wherein the processor is operable to adjust the privacy filter by applying the identified second privacy filter setting.

17. The electronic device according to claim 13, wherein the privacy filter setting comprises a transparency of the privacy filter.

18. The electronic device according to claim 17, wherein the transparency of the privacy filter decreases with increasing brightness of the display.

19. The electronic device according to claim 13, wherein receiving the information comprises receiving, from a user input device, the information for display.

20. The electronic device according to claim 13, wherein receiving the information comprises receiving transmitted information via a network connection.

* * * * *